United States Patent [19]

Pipes

[11] 4,268,207
[45] May 19, 1981

[54] LOAD SUPPORT AND SHUTTLE

[75] Inventor: George R. Pipes, Salt Lake City, Utah

[73] Assignee: Eaton Corporation, Cleveland, Ohio

[21] Appl. No.: 55,260

[22] Filed: Jul. 6, 1979

[51] Int. Cl.³ .............................................. B65G 1/127
[52] U.S. Cl. .................................... 414/277; 414/281; 414/745
[58] Field of Search ............... 414/277, 278, 279, 281, 414/282, 254, 745, 663, 664; 211/134, 183

[56] References Cited

U.S. PATENT DOCUMENTS

| | | | |
|---|---|---|---|
| 493,542 | 3/1893 | Bessing et al. | 414/282 X |
| 2,014,351 | 9/1935 | Becker | 414/254 |
| 2,647,647 | 8/1953 | Alimanestiano | 414/254 |
| 2,765,928 | 10/1956 | Riemenschneider | 414/277 X |
| 2,923,421 | 2/1960 | De Roumefort | 414/254 X |
| 3,557,940 | 1/1971 | Rogers et al. | 414/276 X |
| 3,633,769 | 1/1972 | Dubinsky | 414/282 |
| 3,741,418 | 6/1973 | Gamundi | 414/663 |

Primary Examiner—James L. Rowland

Attorney, Agent, or Firm—R. J. McCloskey; F. M. Sajovec, Jr.

[57] ABSTRACT

A load support and shuttle combination. The load support (20) is in the form of a central beam (24) disposed fore and aft in a storage bay (22) on top of which are mounted a plurality of spaced apart V-shaped load support members (26), the outer ends of which are bent downward to a substantially horizontal position. The shuttle includes a pair of space apart rails (46) which straddle the beam (24). A plurality of spaced load supporting finger members (48) extend inwardly and downwardly from the rails and are sized and shaped such that they fit in the spaces between the V-shaped load support members. A load resting on the load support member can be transferred to the shuttle by inserting the load supporting finger members into a storage bay beneath the load support members and then lifting the shuttle to move the finger members through the spaces between the load support members. In accordance with one aspect of the invention, a specific form of load support is provided comprising fabricated members (60) which interfit to define the V-shaped load supporting members.

12 Claims, 4 Drawing Figures

LOAD SUPPORT AND SHUTTLE

This invention relates to material handling systems, and more particularly to load support and shuttle apparatus for handling loads of differing sizes and shapes.

Automated storage and retrieval systems are well known in industry, a typical system comprising one or more pairs of opposed racks and a stacker vehicle running on rails in an aisle between the racks. Each rack includes a plurality of storage bins or bays, and the stacker vehicle may include a shuttle mechanism which is designed to enter a selected storage bin to either deposit a load into the bin, or to extract a load therefrom.

In many warehouse applications the loads stored in the racks are uniform in size and shape, and a single form of load support within the rack, and a single form of load shuttle can be used. In some cases, however, a single set of racks is used to store a plurality of different shapes and sizes of loads. In order to maximize throughput, it is important to be able to use a single form of load support for various sizes and shapes of loads, and to be able to use a single form of shuttle for all loads. It is also important to be able to store a mixture of the various loads in a single bay.

An example of the above is in the textile industry wherein there is a requirement to store cylindrical bolts of cloth of various diameters and to store various size boxes, each containing a plurality of cylindrical bolts. In order to store and retrieve such loads efficiently, it is important to store combinations of bolts and boxes within the same bay, and to use a single storage and retrieval device to extract goods from the bay and to insert goods therein.

It is thus an object of the invention to provide load support means for use in warehouse storage racks which is capable of supporting loads of varying size and shape for retrieval by a stacker vehicle, and load handling means for use on a stacker vehicle which is capable of stacking loads of various sizes and shapes on said support means, and of retrieving such loads therefrom.

Another object of the invention is to provide apparatus as above in which the load handling means is in the form of a shuttle functioning in combination with such load support means to deposit loads thereon and to extract loads therefrom.

To meet the above objectives, the present invention provides a load support in the form of a central beam disposed fore and aft in a storage bay, on top of which are mounted a plurality of spaced apart load support members. Each load support member is substantially V-shaped with the point of the V aligned with the beam and the legs extending upwardly and outwardly. The outer ends of the V are bent relatively downwardly to define a pair of flat, substantially horizontal platform sections at the ends of the V. The angled portions are adapted to support cylindrical loads of a range of diameters, and the platform portions are adapted to support square or rectangular loads. A plurality of support structures may be spaced apart side-by-side within a bay such that large square or rectangular loads may be supported on two or more support structures.

A shuttle structure is provided which is adapted to be mounted on the output section of a known load shuttle mechanism. The shuttle includes a pair of spaced apart rails which straddle the load support structure in the rack. A plurality of spaced, finger-like members extend inwardly from the rails and are sized and spaced such that they fit in the spaces between the V-shaped load supports. The fingers are shaped similarly to the load support members in that they each include a horizontal section and an angled section which correspond to similar sections on the load support. When a load supported on the load support structure is to be extracted, the shuttle is extended into a rack bay beneath the support members until the fingers are aligned with the spaces between the support members. The load carriage is then raised in known manner until the fingers lift the load off the support structure. The shuttle is then retracted, and the load transported to a transfer point or to another rack location.

Other objects and advantages of the invention will be apparent from the following description when taken in connection with the accompanying drawings, wherein.

Figure 1:
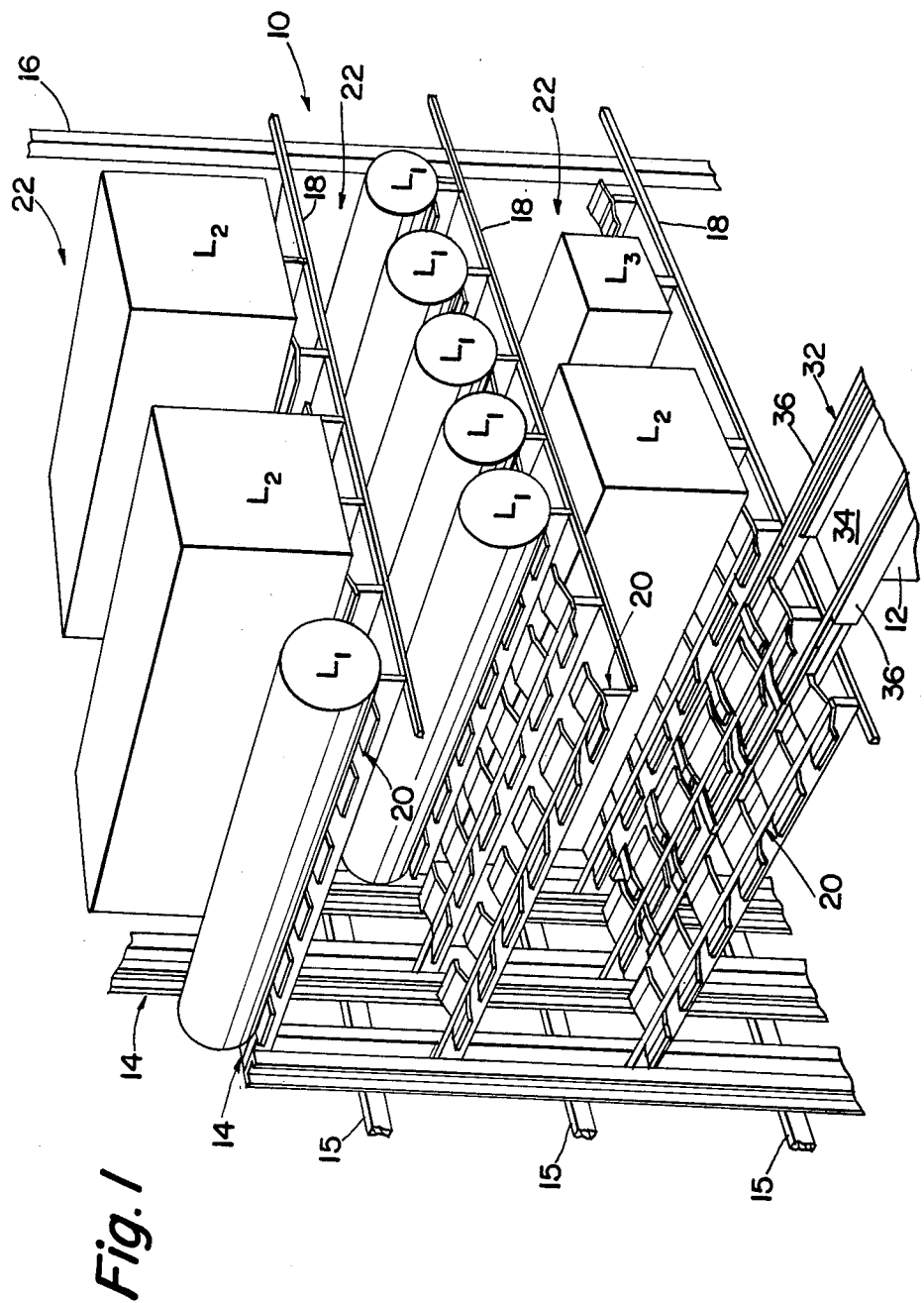
FIG. 1 is a schematic perspective view of the invention as installed in a plurality of storage racks.

Referring to FIG. 1, there is schematically illustrated a section of warehouse racks, designated generally by the numeral 10, and a portion of the load carriage 12 of a stacker vehicle (not shown). Warehouse rack systems are generally well known in the art and will not be described in detail herein. For purposes of the present invention, any known form of stacker vehicle capable of incorporating a load shuttle, such as that shown in U.S. Pat. No. 3,741,418, can be used.

The rack 10 comprises a plurality of spaced apart rear upright members 14, rear crossmembers 15, a plurality of front upright members 16 (only one illustrated herein), a plurality of front crossmembers 18 attached to the front upright members, and a plurality of load support assemblies 20 supported at one end by the rear upright members and at the other end by the front crossmembers. The front upright members 16, certain of the rear upright members 14, and the crossmembers 18 define a plurality of storage bins or bays 22. It can be appreciated that in a typical warehouse installation the racks 10 would be installed in pairs on opposite sides of an aisleway traversed by a stacker vehicle, and could include thousands of bays 22 accessible by the load carriage 12 of the stacker vehicle.

Figure 2:
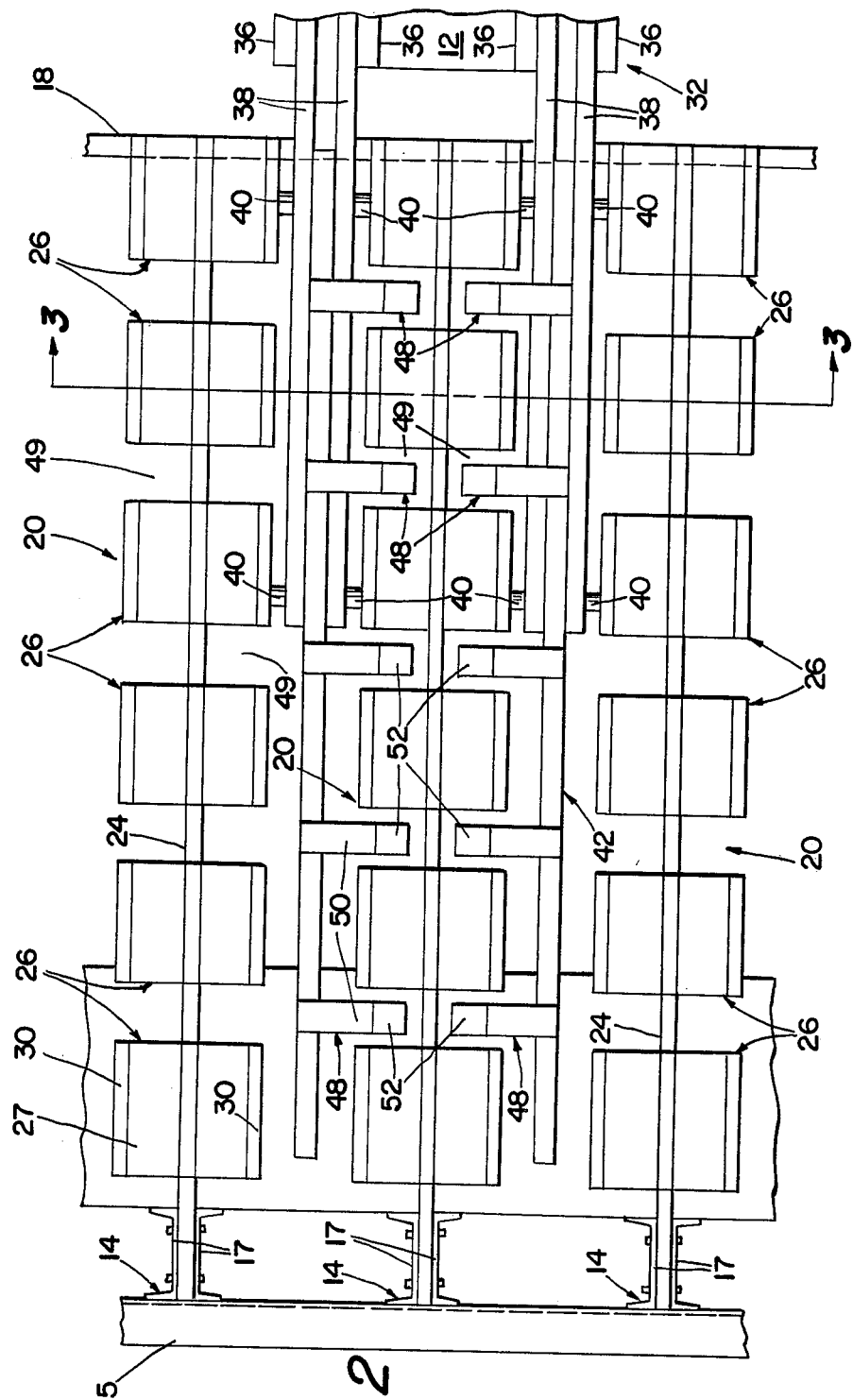
FIG. 2 is a plan view of a plurality of load support structure and a shuttle in position to extract a load therefrom in accordance with the invention.
Figure 3:
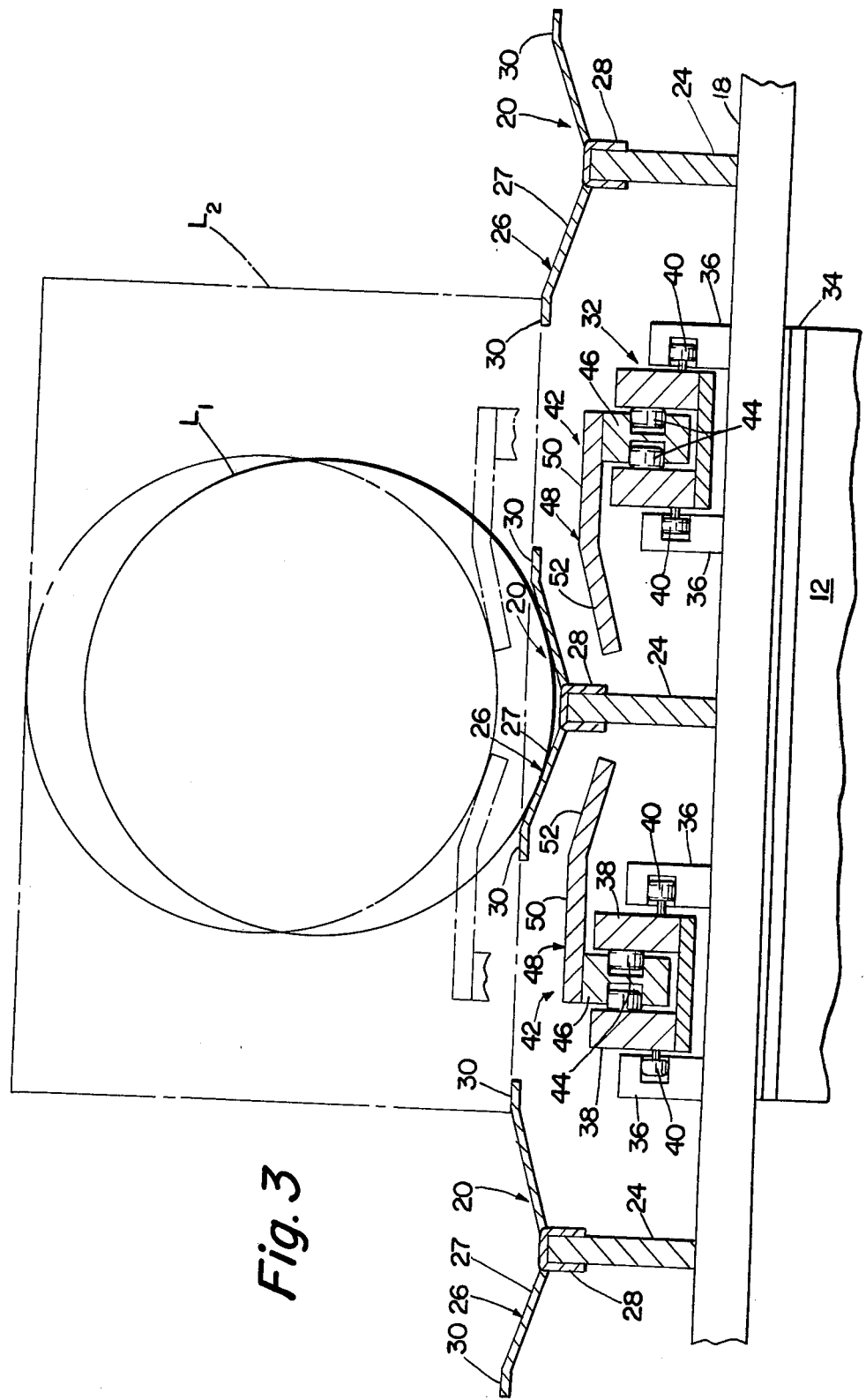
FIG. 3 is a sectional view taken along line 3—3 of FIG. 2.

Referring particularly to FIGS. 2 and 3, each of the load support assemblies comprises an elongated beam or backbone member 24, which can be bolted or otherwise attached to the rear upright 14 and the front crossmembers, and a plurality of support members 26 spaced apart along the beam.

In the embodiment illustrated in FIGS. 2 and 3, each rear upright is defined by a pair of back-to-back channel members 17, and the beam 24 is a solid rectangular bar received between the channel members and bolted thereto. The support member 26 is formed of a load receiving plate member 27 welded to a mounting channel 28, which is then bolted to the beam 24.

Referring specifically to FIG. 3, the load receiving plate 27 is formed as a shallow "V" in cross section, with the point of the V flattened in the area of the mounting channel 28. The ends 30 of the V are bent relatively downwardly until they are substantially horizontal.

In the embodiment illustrated herein, the ends of the beams 24 opposite the uprights 14 are shown as being attached to the crossmember 18; however, it should be appreciated that in certain applications, the crossmembers can be eliminated, and the beams 24 supported by the uprights 14 only. Also, the number, size and spacing of the load receiving plates 27 as well as the number of load support assemblies in each bay can vary depending on the sizes and shapes of the loads to be handled.

The shuttle mechanism per se can be one of a number of shuttle mechanisms which are well known in the art, such as that shown in U.S. Pat. No. 3,741,418, the present invention being concerned with the final stage, or load supporting section, of the shuttle.

In the embodiment illustrated, the shuttle, designated generally by the numeral 32, comprises a base 34 adapted to be attached to the load carriage 12 of the stacker vehicle, pairs of stationary shuttle rails 36, a pair of intermediate shuttle sections 38 linearly movable relative to the stationary rails 36 on rollers 40, and a pair of load supporting rail assemblies 42 linearly movable relative to the intermediate section 38 on rollers 44. In accordance with known practice, drive means (not shown) are provided interconnecting the shuttle sections to drive the load supporting section 42 outward relative to the load carriage and into a selected bin or bay 22 to pick up or deposit a load.

In accordance with the invention, each load supporting rail assembly comprises an elongated rail member 46 which can be in the form of an I-beam as shown in FIG. 3, and a plurality of load engaging plates or fingers 48 extending inwardly toward the longitudinal centerline of the shuttle assembly 32. The fingers 48 can be welded to the tops of the rails 46, and are spaced apart along the rails such that when the shuttle assembly is inserted into a bay, the fingers 48 register with the spaces 49 between the load receiving plates 27.

Each of the load engaging fingers 48 includes a substantially horizontal outer section 50 attached to the rail 46, and an inner section 52 which is angled downwardly with respect to the horizontal section.

The load engaging fingers 48 are sized such that clearance is provided between the inner ends of the opposed plates and the beam 24. The angle defined by the opposed sections 52 is similar to the angle defined by the "V" of the load receiving members 27; however, the angles need not be the same.

OPERATION

FIG. 1 illustrates some of the varied loads which can be handled in accordance with the invention, for example, a cylinder $L_1$, a large rectangular box $L_2$, or a relatively small rectangular box $L_3$. It can be appreciated the various size cylinders can be accommodated. In FIG. 3 an $L_1$ load is shown in full line resting on a load support assembly, with an $L_2$ load shown in broken line. It should be noted that the large $L_2$ load is supported on a central load support assembly 20 and also on the horizontal ends 30 of adjacent load support assemblies; whereas, a small rectangular load $L_3$ can be handled by a single load support assembly 20.

When a load L is to be removed from a bay, a stacker vehicle is directed, either by computer control or manually, to a position which centers the shuttle 32 horizontally with respect to the load support assembly 20 and with the top of the load engaging rail assemblies 42 just below the load receiving plates 27. The shuttle is then extended until the load engaging fingers 48 are substantially centered in the spaces 49 between the plate members 27. The load carriage 12 is then raised several inches so that the fingers 48 move up between the plates 27 and lift the load L therefrom, as shown in broken line in FIG. 3. The shuttle is then retracted until the load L clears the bay to permit the load to be transported to another bay location or to a transfer point at an end of an aisle.

When a load is to be inserted into a bay, the above procedure is reversed, the shuttle being extended to bring the load into the bay above the load support plates 27, and the load carriage being lowered to transfer the load from the fingers 48 to the support plates.

Figure 4:
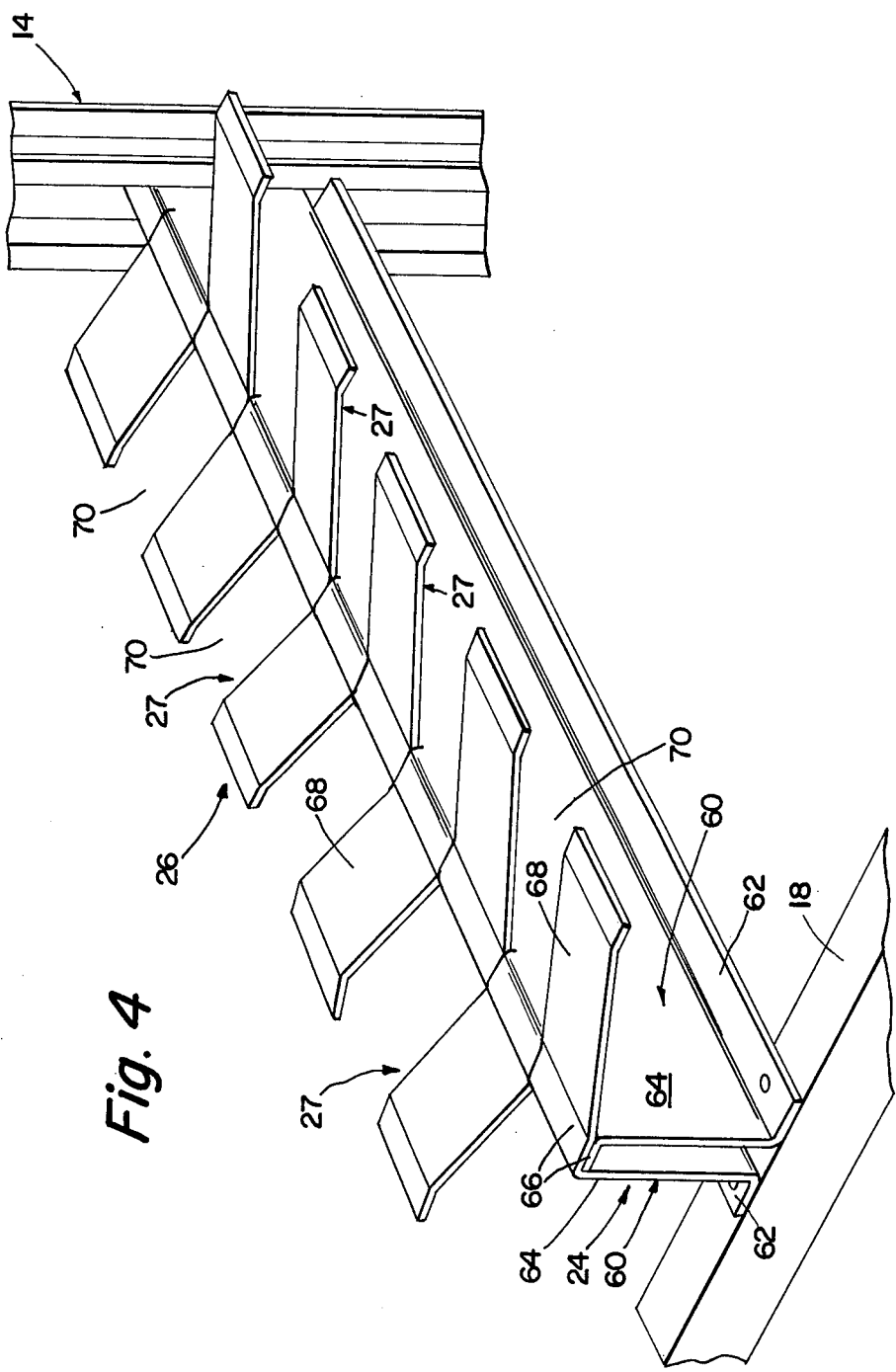
FIG. 4 is a perspective view of an alternative embodiment of the load support structure of the invention.

In FIG. 4, there is illustrated an alternative embodiment of the load support member 26. In this embodiment, the beam 24 and support plates 27 are formed of a pair of fabricated members 60 each including a lower flange section 62, an upstanding wall section 64, an upper flange section 66, and a plurality of load receiving plate sections 68 separated by spaces 70.

To form a support assembly 26 a pair of members 60 is assembled with the upper flanges 66 overlapping as shown, and the plate sections 68 of one member 60 received in the spaces 70 of the other member 60. The members 60 can then be spot welded together at the upper flanges.

If a load support assembly is fabricated with alternating load supporting members, it follows that the shuttle will have to be arranged with similarly alternating fingers 48 which can be aligned with the alternating spaces 70 in order to pick up or deposit a load.

I claim:

1. In a material handling system including a rack structure having a plurality of material storage bays opening into an aisle, load handling means movable horizontally and vertically in said aisle and including load handling shuttle means selectively movable into and out of said bays to transfer loads between said bays and said load handling means; at least one elongated load storage assembly fixed within a storage bay with its longitudinal axis perpendicular to said aisle, said load storage assembly including a plurality of first load supporting members spaced apart along said longitudinal axis; and load handling means mounted on said shuttle means, said load handling means including a plurality of second load supporting members spaced apart along a horizontal axis parallel to the longitudinal axis of said load storage assembly and alignable with the spaces between said first load supporting members; the improvement wherein one of said load storage assembly or load handling means comprises a beam member, and a plurality of load supporting plate members angled upwardly and outwardly from said beam member and having their outer ends bent downwardly to a substantially horizontal position to define opposed substantially horizontally oriented load supporting elements; vertical movement of said load handling means being effective to transfer loads between said load storage assembly and said load handling means as said second load supporting members pass through said spaces.

2. Apparatus as claimed in claim 1, in which said load storage assembly is defined by said beam member and said angled plate members.

3. Apparatus as claimed in claim 2, in which each of said load supporting plate members comprises a substantially V-shaped element, the legs of said V intersecting at said beam member.

4. Apparatus as claimed in claim 2, in which said shuttle means comprises first and second rail members spaced apart horizontally and movable in a path parallel to the longitudinal axis of said beam member with said rail members straddling said beam member, said second load supporting members comprising finger-like plate members attached to said rail members and extending inwardly therefrom.

5. Apparatus as claimed in claim 4, in which each of said second load supporting members includes a first horizontally disposed section attached to the rail member, and a second section angled downwardly from the horizontal.

6. Apparatus as claimed in claim 1, in which each of said storage bays includes a plurality of said elongated load storage assemblies spaced apart with their longitudinal axes parallel.

7. Apparatus as claimed in claim 6, in which said rack structure comprises a plurality of vertical beam members, each of said beam members comprising a pair of channel members spaced apart in back-to-back relationship; and each of said elongated load storage assemblies includes a horizontal beam member received between said back-to-back channel members, and fastened thereto.

8. In apparatus for handling loads comprising a fixed load supporting assembly including a plurality of first horizontally aligned, spaced apart load supporting members; a movable load handling assembly including shuttle means movable in a first path parallel to said first load supporting members and in a second path perpendicular to said first load supporting members, and a plurality of second load supporting members spaced apart along said shuttle means and alignable with the spaces between said first spaced apart load supporting members, movement of said shuttle means along said second path being effective to transfer loads between said fixed and movable load supporting assemblies; the improvement wherein one of said fixed load supporting assembly or movable load handling assembly comprises a beam member and a plurality of load supporting plate members angled upwardly and outwardly from said beam member and having their outer ends bent downwardly to a substantially horizontal position to define substantially horizontally oriented load supporting elements.

9. Apparatus as claimed in claim 8, in which said fixed load supporting assembly is defined by said beam member and said angled plate members.

10. Apparatus as claimed in claim 9, in which each of said load support plate members comprises a substantially V-shaped element, the legs of said V intersecting at said beam member.

11. Apparatus as claimed in claim 9, in which said shuttle means comprises first and second rail members spaced apart horizontally and movable in a path parallel to the longitudinal axis of said beam member with said rail members straddling said beam member, said second load supporting members comprising plate members attached to said rail members and extending inwardly therefrom.

12. Apparatus as claimed in claim 11, in which each of said second load supporting members includes a first horizontally disposed section attached to the rail member, and a second section angled downwardly from the horizontal.

* * * * *